United States Patent [19]

Nosenchuck et al.

[11] Patent Number: 4,811,214
[45] Date of Patent: Mar. 7, 1989

[54] MULTINODE RECONFIGURABLE PIPELINE COMPUTER

[75] Inventors: Daniel M. Nosenchuck, Mercerville, N.J.; Michael G. Littman, Philadelphia, Pa.

[73] Assignee: Princeton University, Princeton, N.J.

[21] Appl. No.: 931,549

[22] Filed: Nov. 14, 1986

[51] Int. Cl.⁴ .......................... G06F 9/00; G06F 15/16
[52] U.S. Cl. ................................................. 364/200
[58] Field of Search ... 364/736, 748, 749, 200 MS File, 364/900 MS File

[56] References Cited

U.S. PATENT DOCUMENTS

| | | | |
|---|---|---|---|
| 3,787,673 | 1/1974 | Watson et al. | 364/736 |
| 3,875,391 | 4/1975 | Shapiro et al. | 364/736 |
| 3,978,452 | 8/1976 | Barton et al. | 364/200 |
| 3,990,732 | 11/1976 | Reicherl | 289/2 |
| 4,051,551 | 9/1977 | Lawrie et al. | 364/200 |
| 4,101,960 | 7/1978 | Stokes et al. | 364/200 |
| 4,161,036 | 7/1979 | Morris et al. | 364/900 |
| 4,174,514 | 11/1979 | Sternberg | 382/49 |
| 4,225,920 | 9/1980 | Stikes et al. | 364/200 |
| 4,228,497 | 10/1980 | Gupta et al. | 364/200 |
| 4,244,019 | 1/1981 | Anderson et al. | 364/200 |
| 4,247,892 | 1/1981 | Lawrence | 364/200 |
| 4,270,181 | 5/1981 | Tanakura et al. | 364/736 |
| 4,307,447 | 12/1981 | Provanzano et al. | 364/200 |
| 4,363,094 | 12/1982 | Kaul et al. | 364/200 |
| 4,438,494 | 5/1984 | Budde et al. | 364/200 |
| 4,442,498 | 4/1984 | Rosen | 364/745 |
| 4,454,489 | 6/1984 | Donazzan et al. | 333/227 |
| 4,454,578 | 6/1984 | Matsumoto et al. | 364/200 |
| 4,467,409 | 8/1984 | Potash et al. | 364/200 |
| 4,482,953 | 11/1984 | Burke et al. | 364/200 |
| 4,491,020 | 1/1985 | Chubachi | 73/606 |
| 4,498,134 | 2/1985 | Hansen et al. | 364/200 |
| 4,507,728 | 3/1985 | Sakamoto | 364/200 |
| 4,589,067 | 5/1986 | Porter et al. | 364/200 |
| 4,594,655 | 1/1986 | Hao et al. | 364/200 |
| 4,612,628 | 9/1986 | Beauchamp et al. | 364/748 |
| 4,621,339 | 11/1986 | Wagner et al. | 364/900 |
| 4,761,755 | 8/1988 | Ardini, Jr. et al. | 364/749 |

OTHER PUBLICATIONS

Schneck et al., "Parallel Processor Programs in the Federal Government", *IEEE Computer*, Jun., 1985, pp. 43-56.

Kogge, Peter, "The Microprogramming of Pipelined Processors", *The 4th Annual Symposium on Computer Architecture Conference Proceedings*, ACM, Mar. 1977, pp. 63-69.

Nosenchuck et al., "Two-Dimensional Nonsteady Viscous Flow Simulation on the Navier-Stokes Computer MiniNode", *Journal of Scientific Computing*, vol. 1, No. 1, 1986, pp. 53-71.

*Primary Examiner*—Gareth D. Shaw
*Assistant Examiner*—Jonathan C. Fairbanks
*Attorney, Agent, or Firm*—Richard C. Woodbridge

[57] ABSTRACT

A multinode parallel-processing computer is made up of a plurality of innerconnected, large capacity nodes each including a reconfigurable pipeline of functional units such as Integer Arithmetic Logic Processors, Floating Point Arithmetic Processors, Special Purpose Processors, etc. The reconfigurable pipeline of each node is connected to a multiplane memory by a Memory-ALU switch NETwork (MASNET). The reconfigurable pipeline includes three (3) basic substructures formed from functional units which have been found to be sufficient to perform the bulk of all calculations. The MASNET controls the flow of signals from the memory planes to the reconfigurable pipeline and vice versa. the nodes are connectable together by an internode data router (hyperspace router) so as to form a hypercube configuration. The capability of the nodes to conditionally configure the pipeline at each tick of the clock, without requiring a pipeline flush, permits many powerful algorithms to be implemented directly.

24 Claims, 9 Drawing Sheets

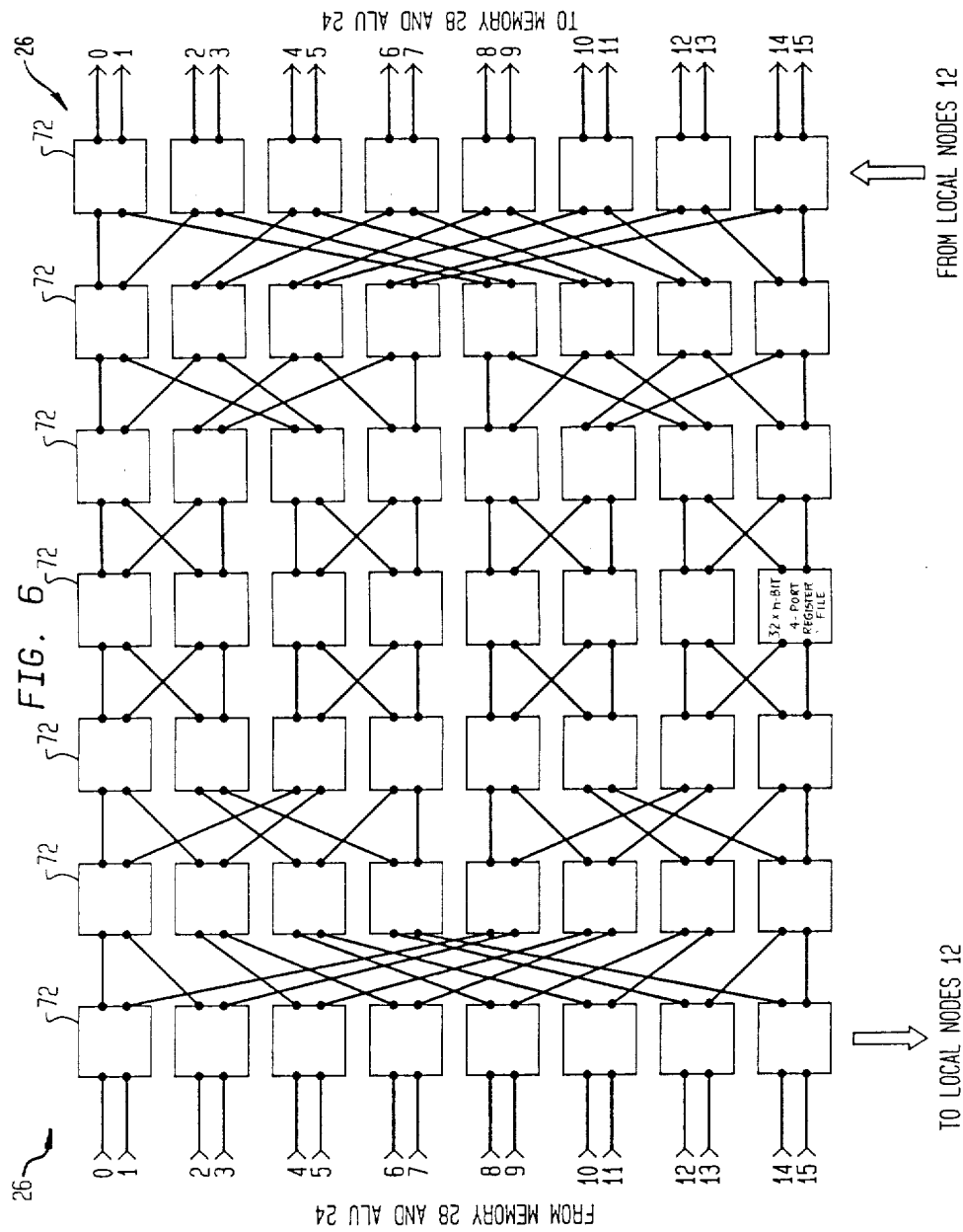

MULTINODE RECONFIGURABLE PIPELINE COMPUTER

GOVERNMENT RIGHTS

This invention was made with Goverment support under control-NAG-1-494 awarded by NASA. The Goverment has certain rights in this invention.

BACKGROUND OF THE INVENTION

1. Field of the Invention

The invention relates to a computer formed of many nodes in which each of the nodes includes a reconfigurable, many-function ALU pipeline connected to multiple, independent memory planes through a multi-function memory-ALU network switch (MASNET) and the multiple nodes are connected in a hypercube topology.

2. Description of Related Art

The computer of the present invention is both a parallel and a pipelined machine. The prior art does disclose in certain limited contexts the concept of parallelism and pipelining. See, for example, U.S. Pat. No. 4,589,067. However, the internal architecture of the present invention is unique in that it allows for most, if not all of the computer building blocks being simultaneously active. U.S. Pat. No. 4,589,067 is typical of the prior art in that it describes a vector processor based upon a dynamically reconfigurable ALU pipeline. This processor is similar to a single functional unit of the present invention's reconfigurable pipeline. In one sense the pipeline of the present invention's node is thus a pipeline of pipelines. Other structures that possibly merit comparison with the present invention are the Systolic Array by Kung, The MIT Data-Flow Concept and the concept of other parallel architectures.

The Systolic Array concept by H. T. Kung of Carnegie Melon University involves data which is "pumped" (i.e. flows) through the computer as "waves". Unlike the present invention, the Systolic Array system is comprised of homogenous building blocks where each building block performs a given operation. In the Systolic Array computer, as data flows through, the interconnection between identical building blocks remains fixed during a computation. At best, the configuration cannot be changed until all data is processed by the Systolic Array. In the present invention, by contrast, the interconnection between building blocks can be changed at any time, even when data is passing through the pipeline (i.e. dynamic reconfiguration of interconnects). The present invention is also distinct from the Systolic Array concept in that each building block (i.e. functional unit) of the node pipeline of the present invention can perform a different operation from its neighbors (e.g. functional unit 1 - floating point multiply; functional unit 2-integer minus; functional unit 3 - logical compare, etc.). In addition, during the course of computation, each building block of the present invention can assume different functionalities (i.e. reconfiguration of functionality).

The MIT Data-Flow computer is comprised of a network of hardware-invoked instructions that may be connected in a pipeline arrangement. The instruction processing is asynchronous to the "data-flow". Each data word is appended with a field of token bits which determines the routing of the data to the appropriate data instruction units. Each instruction unit has a data queue for each operand input. The instruction does not "fire" (i.e. execute) until all operands are present. The present invention include the concept of data flowing through a pipeline network of hardware functional units that perform operations on data (e.g. act as instructions that process data). However, by contrast, the present invention does not function in an asynchronous mode. Instead, data is fetched from memory and is routed by a switch (MASNET) to pipelined instruction units through the centralized control of a very high speed microsequencing unit. This synchronous control sequence is in sharp contrast to the asynchronous distributed data routing invoked by the Data Flow architecture.

Moreover, the present invention, unlike the Data-Flow Machine, has no token field (i.e. a data field that guides the data to the approriate functional unit) nor do the functional units have queues (i.e. buffers that hold operands, instructions, or results). The Data-Flow Machine has functional units waiting for data. The present invention has functional units that are continuously active. The control of the pipeline of the present invention is achieved by a central controller, referred to as a microsequencer, whereas the Data-Flow Machine uses distributed control. The present invention also has the ability to reconfigure itself based upon internal flow of data using the TAG field, a feature not found in Data-Flow machine. Furthermore, the Data-Flow computer does not effectively perform series of like or dissimilar computations on continuous streams of vector data (i.e. a single functional operation on all data flowing through the pipeline). In contrast the present invention performs this operation quite naturally.

There are two other principal differences between the parallel architecture of the present invention and other parallel architectures. First, each node of the present invention involves a unique memory/processor design (structure). Other parallel architectures involve existing stand-alone computer architectures augmented for interconnection with neighboring nodes. Second, other general multiple-processors/parallel computers use a central processing unit to oversee and control interprocessor communications so that local processing is suspended during global communications. The nodes of the present invention, by contrast, use an interprocessor router and cache memory which allows for communications without disturbing local processing of data.

The following U.S. Patents discuss programmable or reconfigurable pipeline processors: 3,787,673; 3,875,391; 3,990,732; 3,978,452; 4,161,036; 4,225,920; 4,228,497; 4,307,447; 4,454,489; 4,467,409; and 4,482,953. A useful discussion of the history of both programmable and non-programmable pipeline processors is found in columns 1 through 4 of U.S. Pat. No. 4,594,655. In addition, another relevant discussion of the early efforts to microprogram pipeline computers is found in the article entitled PROGRAMMING OF PIPELINED PROCESSORS by Peter M. Kogge from the March 1977 edition of COMPUTER ARCHITECTURE pages 63–69.

Lastly, the following U.S. Patents are cited for their general discussion of pipelined processors: 4,051,551; 4,101,960; 4,174,514; 4,244,019; 4,270,181; 4,363,094; 4,438,494; 4,442,498; 4,454,578; 4,491,020; 4,498,134 and 4,507,728.

SUMMARY OF THE INVENTION

Briefly described, the present invention uses a small number (e.g. 128) of powerful nodes operating concurrently. The individual nodes need not be, but could be, synchronized. By limiting the number of nodes, the total communications and related hardware and software that is required to solve any given problem is kept to a manageable level, while at the same time, using to advantage the gain and speed and capacity that is inherent with concurrency. In addition, the interprocessor communications between nodes of the present invention that do occur, do not interrupt the local processing of data within the node. These features provide for a very efficient means of processing large amounts of data rapidly. Each node of the present invention is comparable to the speed and performance to Class VI supercomputers (e.g. Cray 2 Cyber 205, etc.). Within a given node the computer uses many (e.g. 30) functional units (e.g. floating point arithmetic processors, integer arithmetic/logic processors, special-purpose processors, etc.) organized in a synchronous, dynamically-reconfigurable pipeline such that most, if not all, of the functional units are active during each clock cycle of a given node. This architectural design serves to minimize the storage of intermediate results in memory and assures that the sustained speed of typical calculation is close to the peak speed of the machine. This, for example, is not the case with existing Class VI supercomputers where the actual sustained speed for a given computation is much less than the peak speed of the machine. In addition, the invention further provides for flexible and general interconnection between the multiple planes of memory, the dynamically reconfigurable pipeline, and the interprocessor data routers.

Each node of the present invention includes a reconfigurable arithmetic/logic unit (ALU), a multiplane memory and a memory-ALU network (MASNET) switch for routing data between the memory planes and the reconfigurable ALU. Each node also includes a microsequencer and a microcontroller for directing the timing and nature of the computations within each node. Communication between nodes is controlled by a plurality of hyperspace routers. A front end computer associated with significant off-line mass storage provides the input instructions to the multi-node computer. The preferred connection topology of the node is that of a boolean hypercube.

The reconfigurable ALU pipeline within each node preferably comprises pipeline processing elements including floating-point processors, integer/logic processors and special-purpose elements. The processing elements are wired into substructures that are known to appear frequently in many user applications. Three hardwired substructures appear frequently within the reconfigurable ALU pipeline. One substructure comprises a two element unit, another comprises a three-element unit and the last substructure comprises a one-element unit. The three-element substructure is found typically twice as frequently as the two element substructure and the two element substructure is found typically twice as frequently as the one element substructure. The judicious use of those substructures helps to reduce the complexity of the switching network employed to control the configuration of the ALU pipeline.

The invention will be further understood by reference to the following drawings.

BRIEF DESCRIPTION OF THE DRAWINGS

FIG. 6 is, a schematic diagram of a 32-register $\times$ n-bit, memory/ALU network switch (MASNET) and internode communications unit where the blocks represent six port register files.

DETAILED DESCRIPTION OF THE INVENTION

During the course of this description, like numbers will be used to identify like elements according to the different figures which illustrate the invention.

Figure 1:
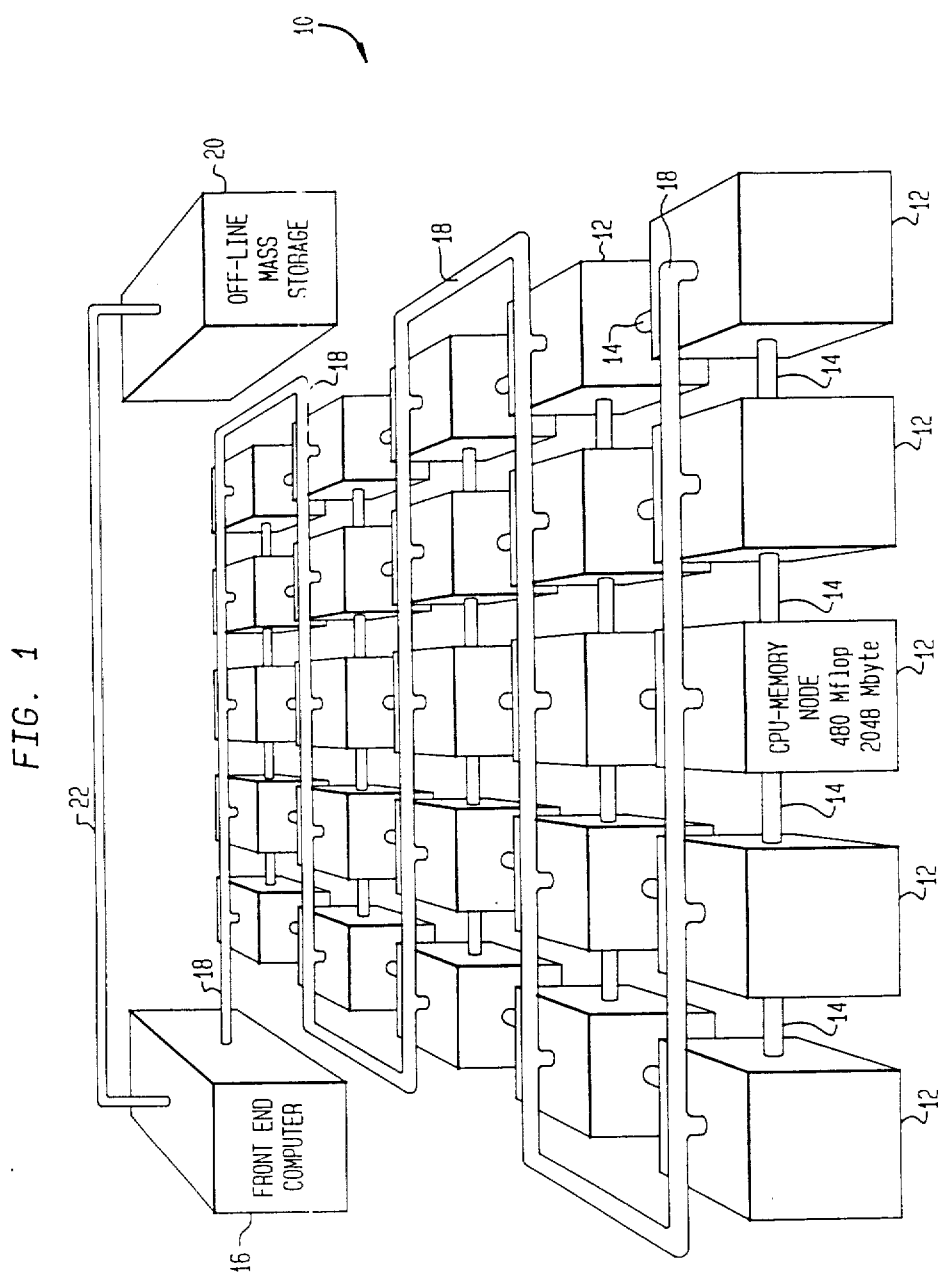
FIG. 1 illustrates an embodiment of the multinode computer arranged in a two-dimension nearest-neighbor grid which is a subset of the boolean hypercube.

The computer 10 according to the preferred embodiment of the invention illustrated in FIG. 1 includes a plurality of multiple memory/computational units referred to as nodes 12. Computer 10 is of the parallel-processing variety capable of performing arithmetic and logical operations with high vector and scaler efficiency and speed. Such a device is capable of solving a wide range of computational problems. Each node 12 is connected via drop-line network 18 to a front end computer 16 that provides a host environment suitable for multi-user program development, multinode initialization and operation, and off-line data manipulation. Front-end computer 16 is connected to an offline mass storage unit 20 by interconnection 22. Each node 12 is also connected to adjacent nodes by internode connections 14. For purposes of clarity and illustration, only 25 nodes 12 are illustrated with simple internode links 14 in FIG. 1. However, it will be appreciated that the nodes 12 can be connected in a general hypercube configuration and that the invention may comprise fewer or more than 128 nodes as the application requires. Rather than interconnect a large number of relatively slow microprocessors, as is done with other prior art parallel computers, the present invention incorporates a relatively small number of interconnected, large-capacity, high-speed powerful nodes 12. According to the preferred embodiment of the present invention, the configuration typically consists of between 1 and 128 nodes 12. This approach limits the number of physical and logical interconnects 14 between nodes 12. The preferred connection topology is that of a boolean hypercube. Each of the nodes 12 of the computer 10 is comparable to a class VI supercomputer in processing speed and capacity.

Figure 2:
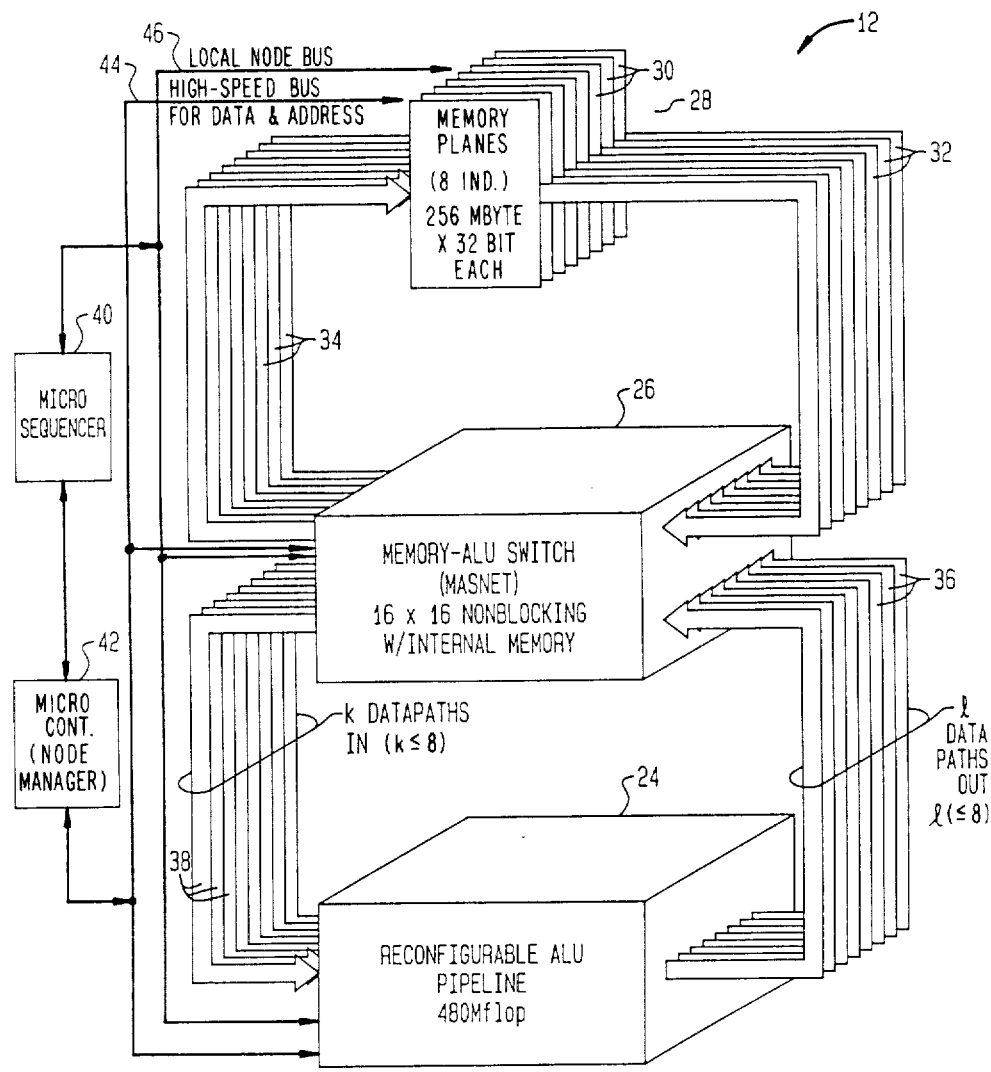
FIG. 2 is a schematic diagram of an individual node illustrating the memory/MASNET/ALU circuit interconnections.

The details of a typical individual node 12 are illustrated in FIG. 2. Each node 12, which is the building block of the computer 10, is comprised of five (5) basic elements, namely: (1) a reconfigurable ALU pipeline 24 having many (e.g. 9 or more) high-performance and special-purpose elements 62 (2) a group 28 of independent memory planes 30, (3) a non-blocking multipleinput and multiple-output switching MASNET (Memory/ALU Switch network) 26, (4) a microsequencer 40 and (5) a microcontroller 42. FIG. 2 illustrates such a node 12 which includes 8 memory planes 30 connected to a reconfigurable pipeline 24 by memory-ALU network switch (MASNET) 26. As used in this description the terms "processing elements", "functional unit", "programmable processors" and "building blocks" refer to arithmetic/logic units 62 which comprise either floating point arithmetic processors, integer/arithmetic/logic processors, special-purpose processors or a combination of the foregoing.

Microsequencer 40 is connected via lines 46 to memory 28, MASNET 26 and reconfigurable ALU pipeline 24 respectively. Similarly, microcontroller 42 is connected to the same elements via lines 44. Microsequencer 40 governs the clocking of data between and within the various elements and serves to define data pathways and the configuration of pipeline 24 for each clock tick of the node 12. In a typical operation, a new set of operands is presented to the pipeline 24 and a new set of results is derived from the pipeline 24 on every clock of the node 12. Microsequencer 40 is responsible for the selection of the microcode that defines the configuration of pipeline 24, MASNET 26 and memory planes 30. In typical operation, the addresses increase sequentially in each clock period from a specific start address until a specified end address is reached. The address ramp is repeated continually until an end-of-computation interrupt flag is issued. The actual memory address used by a given plane 30 of memory 28 may differ from the microsequencer 40 address depending upon the addressing mode selected. (See discussion concerning memory planes below).

Microcontroller 42, also referred to as a node manager, is used to initialize and provide verification of the various parts of the node 12. For a given computation, after the initial set up, control is passed to the microsequencer 40 which takes over until the computation is complete. In principal, microcontroller 42 does not need to be active during the time that computations are being performed although in a typical operation the microcontroller 42 would be monitoring the progress of the computation and preparing unused parts of the computer for the next computation.

In addition to the five basic elements which constitute a minimal node 12, each node 12 ma be expanded to include local mass storage units, graphic processors, pre-and post-processors, auxilliary data routers, and the like. Each node 12 is operable in a stand-alone mode because the node manager 42 is a standalone microcomputer. However, in the normal case the node 12 would be programmed from the front-end computer 16.

Figure 3:
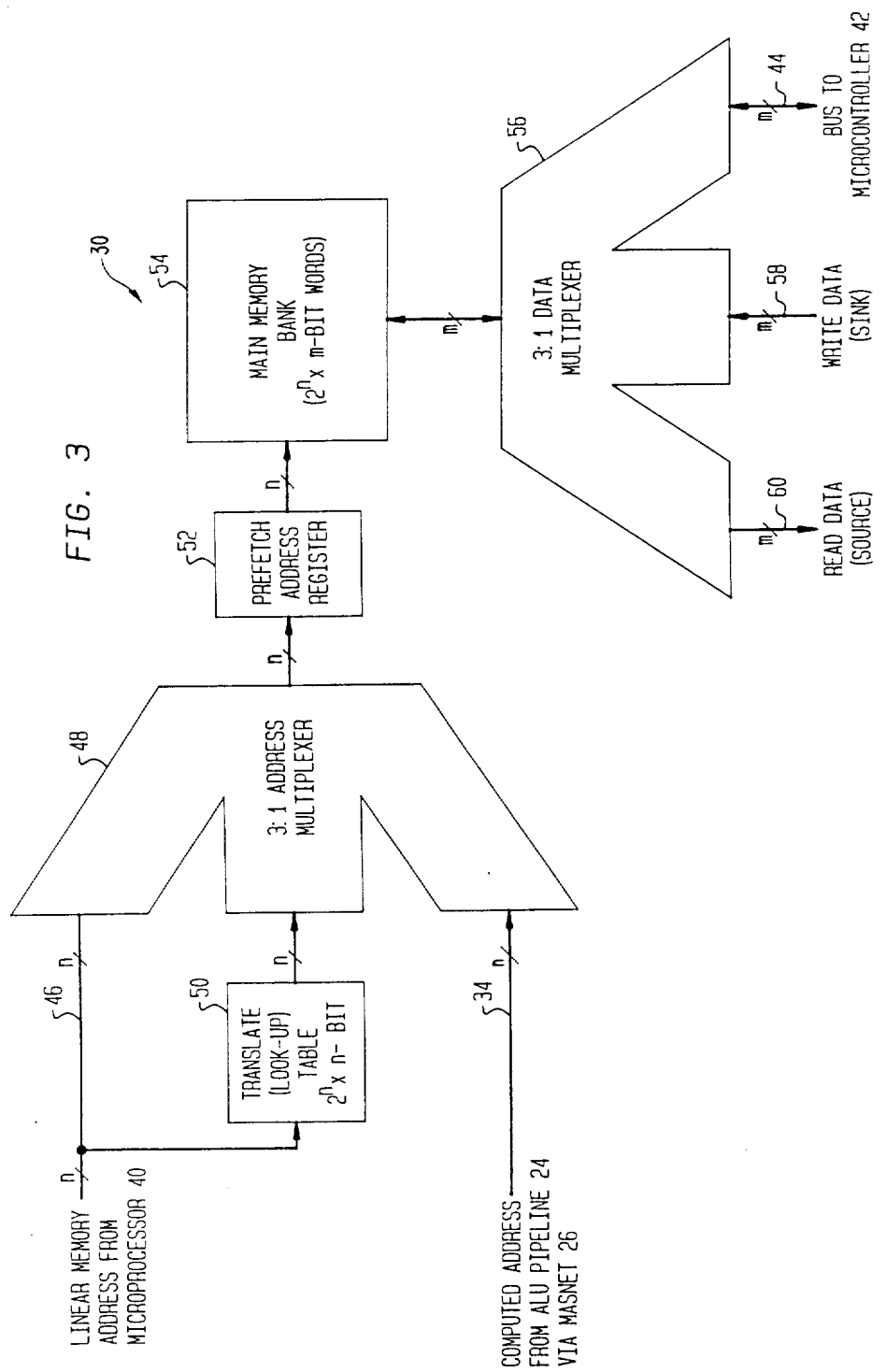
FIG. 3 is a schematic diagram illustrating the layout of one memory plane within a single node such as illustrated in FIG. 2.

The layout of a single memory plane 30 is schematically illustrated in FIG. 3 Memory planes 30 are of high capacity and are capable of sourcing (reading) or sinking (writing) a data word in a clock of the machine 10.

Each memory plane 30 can be enabled for read-only, write-only or read/write operations. The memory planes 30 support three possible addressing modes, namely: (1) direct, (2) translate and (3) computed. With all three modes, the working address is prefetched by prefetch address register 52 on the previous cycle of the computer 10. In the direct mode, the address from the microsequencer address bus 46 is used to select the memory element of interest. In the translate mode, the microsequencer address is used to look up the actual address in a large memory table of addresses. This large table of addresses is stored in a separate memory unit referred to as the translate memory bank or table 50. The translate table 50 can be used to generate an arbitrary scan pattern through main memory bank 54. It can also be used to protect certain designated memory elements from ever being over-written. The computed address mode allows the pipeline 24 to define the address of the next sourced or sinked data word.

Figure 4:
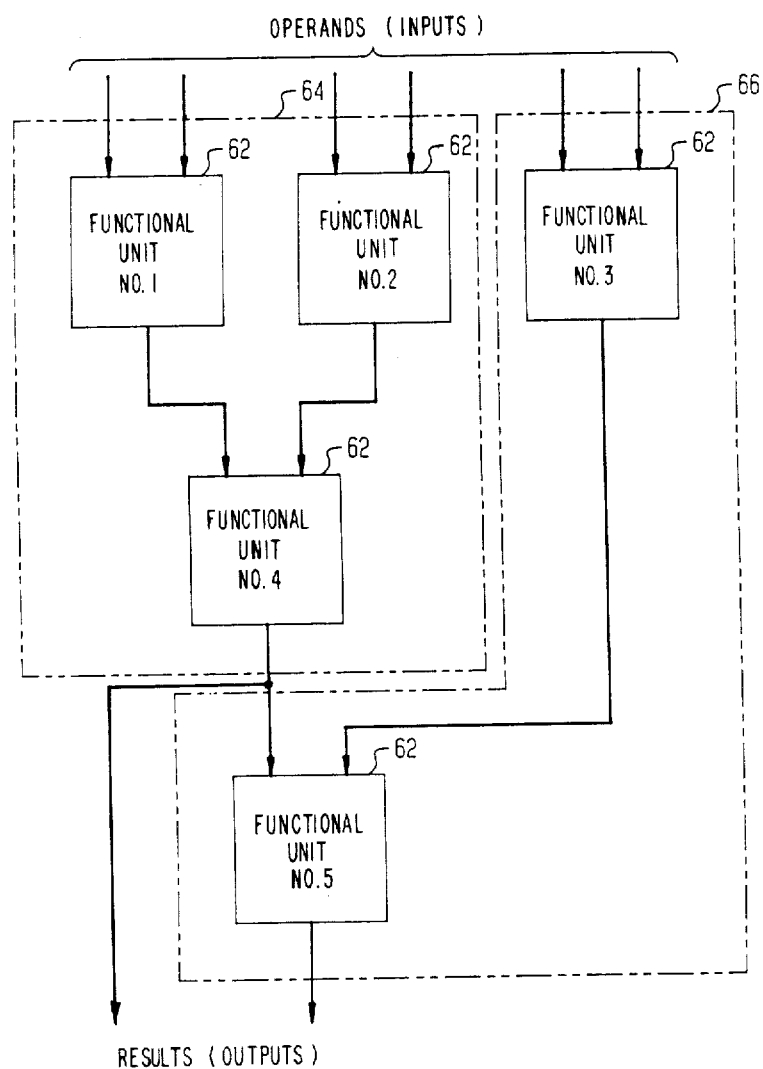
FIG. 4 illustrates two typical substructures formed from five arithmetic/logic units as might be found within the reconfigurable ALU pipeline of each node.
Figure 5A:
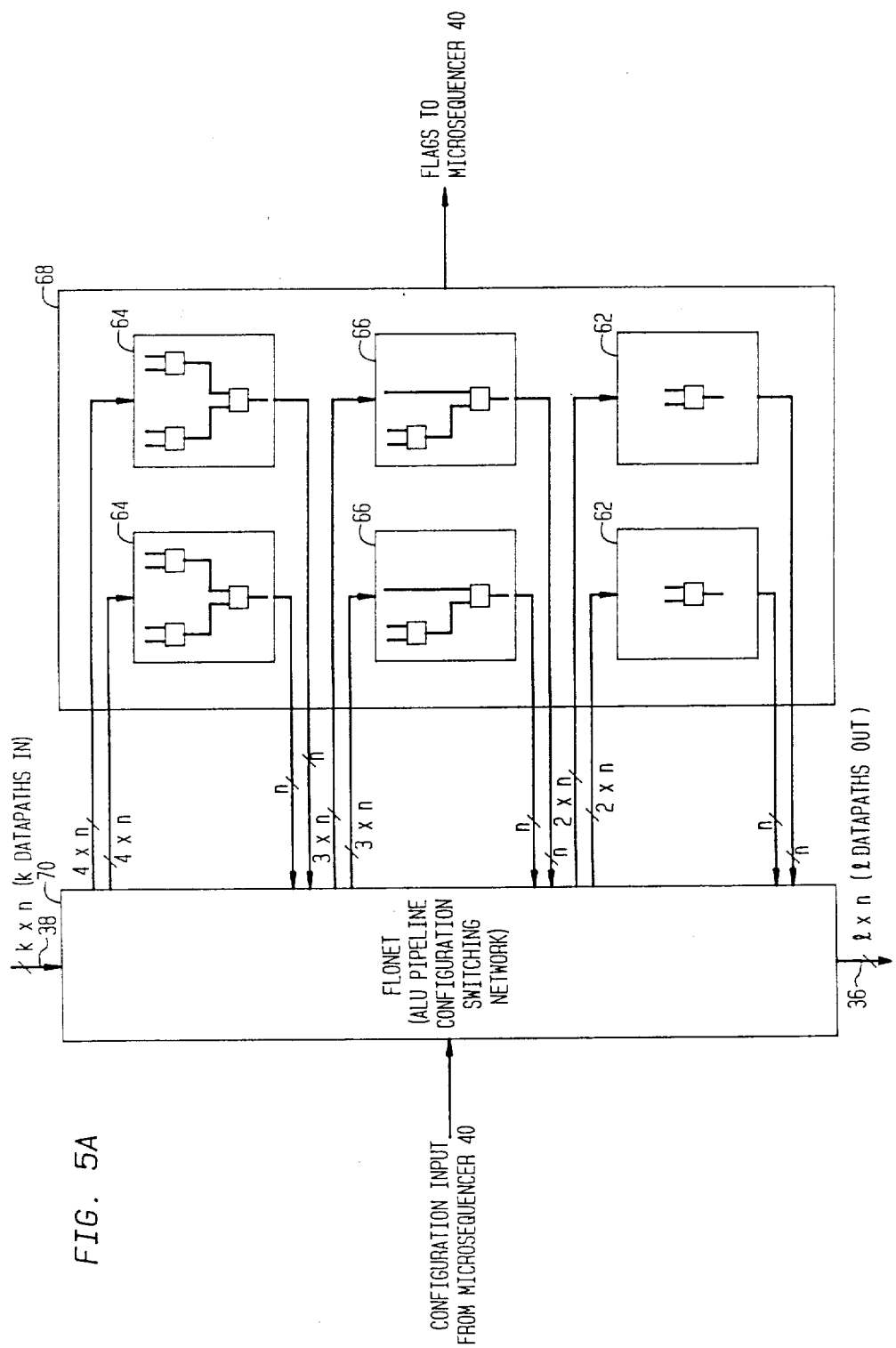
FIG. 5A illustrates a typical ALU pipeline organization and the switching network (FLONET) which allows for a change in configuration of the substructures.
Figure 5B:
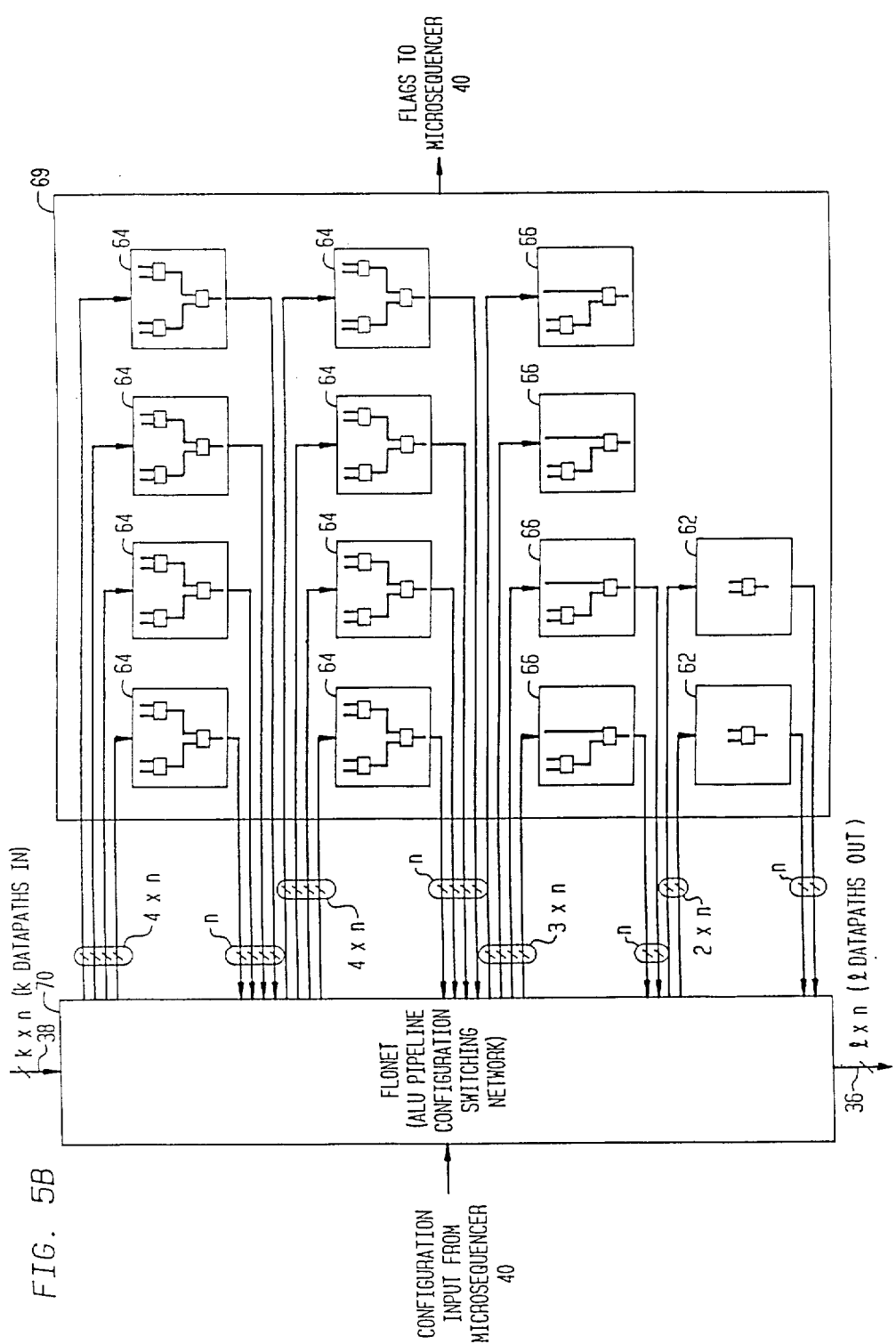
FIG. 5B illustrates a preferred embodiment of the interconnection of a FLONET to a grouping of the three common substructures in a reconfigurable ALU pipeline.

Reconfigurable pipeline 24 is formed of various processing elements shown as units 62 in FIG. 4 and a switch network shown as FLONET 70 in FIGS. 5A and 5B (FLONET is an abbreviation for Functional and Logical Organization NETwork). Three (3) permanently hardwired substructures or units 62, 64 or 66 are connected to FLONET. FLONET 70 reconfigures the wiring of the pipelined substructures 62, 64 and 66 illustrated collectively as 68 in FIG. 5A and 69 in FIG. 5B. The specialized reconfigurable interconnection is achieved b electronic switches so that new configurations can be defined within a clock period of the node 12. An example of high-level data processing in a specific situation is shown in FIG. 4. The pipeline processing elements include floating-point arithmetic processors (e.g. AMD 29325, Weitek 1032/1033), integer arithmetic/logic units 62 (e.g. AMD 2933% and special-purpose elements such as vector regeneration units and convergence checkers. A useful discussion related to the foregoing special-purpose elements can be found in an article entitled "Two-Dimensional, Non Steady Viscous Flow Simulation on the Navier Stokes Computer MiniNode", *J. Sci. Compute*, Vol. 1, No. 1 (1986) by D. M. Nosenchuck, M. G. Littman and W. Flannery. Processing elements 62 are wired together in three (3) distinct substructures 62, 64 and 66 that have been found to appear frequently in many user application programs. Two of the most commonly used substructures 64 and 66 are shown by the elements enclosed in dotted lines in FIG. 4. Substructure 64 comprises three ALU units 62 having four inputs and one output. Two ALU units 62 accept the four inputs in two pairs of twos. The outputs of the two ALU units 62 form the two inputs to the third ALU unit 62. Each of the three ALU units 62 are capable of performing floating point and interger addition, subtraction, multiplication and division, logical AND, OR, NOT exclusive OR, mask, shift, and compare functions with a logical register file used to store constants. Substructure 66 comprises two arithmetic/-logic units 62 and is adapted to provide three inputs and one output. One of the two arithmetic/logic units 62 accepts two inputs and produces one output that forms one input to the second arithmetic/logic unit 62. The other input to the second arithmetic/logic unit 62 comes directly from the outside. The single output of substructure 66 comes from the second arithmetic/logic unit 62. Accordingly, substructure 66 comprises a three input and one output device. The third and last most common substructure is an individual arithmetic/logic unit 62 standing alone, i.e. two inputs and one output. Substructures 62, 64 and 66 are permanently hardwired into those respective configurations, however, the reconfiguration among those units is controlled by FLONET 70. A simplified FLONET 70 is schematically represented in FIG. 5A. For simplicity, two three-element substructures 64, two two-element substructures 66 and two one-element substructures 62 are illustrated. This results in a twelve-functional unit, high-level reconfigurable pipeline 24.

FIG. 5B illustrates an optimal layout of a FLONET/ALU interconnect. According to the preferred embodiment of the invention 10, the optimal ratio between the three-element substructures 64 and the two element substructures 66 is in the range of 1.5 to 2.0 to 1.0 (1.5-2.0:1). Likewise the optimal ratio between the two element substructures 66 and the single-element substructures 62 is approximately 2 to 1 (2:1). Accordingly, FIG. 5B illustrates the optimal scenario which includes eight three-element substructures 64, four two-element substructures 66 and two single-element substructures 62. The number of three element substructures 64 could vary between 6 and 8 according to the embodiment illustrated in FIG. 5B. The preferred ratios just described are approximate and might vary slightly from application to application. However, it has been found that the foregoing ratios do provide very close to optimal results.

According to the preferred embodiment of the invention the grouping 69 of substructure 62, 64 and 66 in FIG. 5B have the functional units, or building blocks, 62 organized in the following manner: each of the three function units 62 (i.e. prorammable processors) in the eight substructures 64 would be floating point processors like the AMD 29325; two of substructures 66 would have each of their two functional units 62 in the form of floating point processors like the AMD 29325 whereas the remaining two substructures 66 would have integer/logic processors like the AMD 29332; lastly one of the remaining single functional units 62 would be a floating point processor like the AMD 29325 and the other remaining single functional unit 62 would be an integer logic processor like the AMD 29332. Alternatively, it is also possible to pair processors to form a hybrid functional unit 62. For example, a floating point processor like the AMD 29325 could be paired in a manner known to those of ordinary skill in the art with an integer logic processor like the AMD 29332 so that the functional unit 62 can alternate between floating point and integer/logic. It is also possible to use a single many-function processor (floating point arithmetic, integer arithmetic/logic) like the Weitek 3332 to activate the same result.

Figure 7:
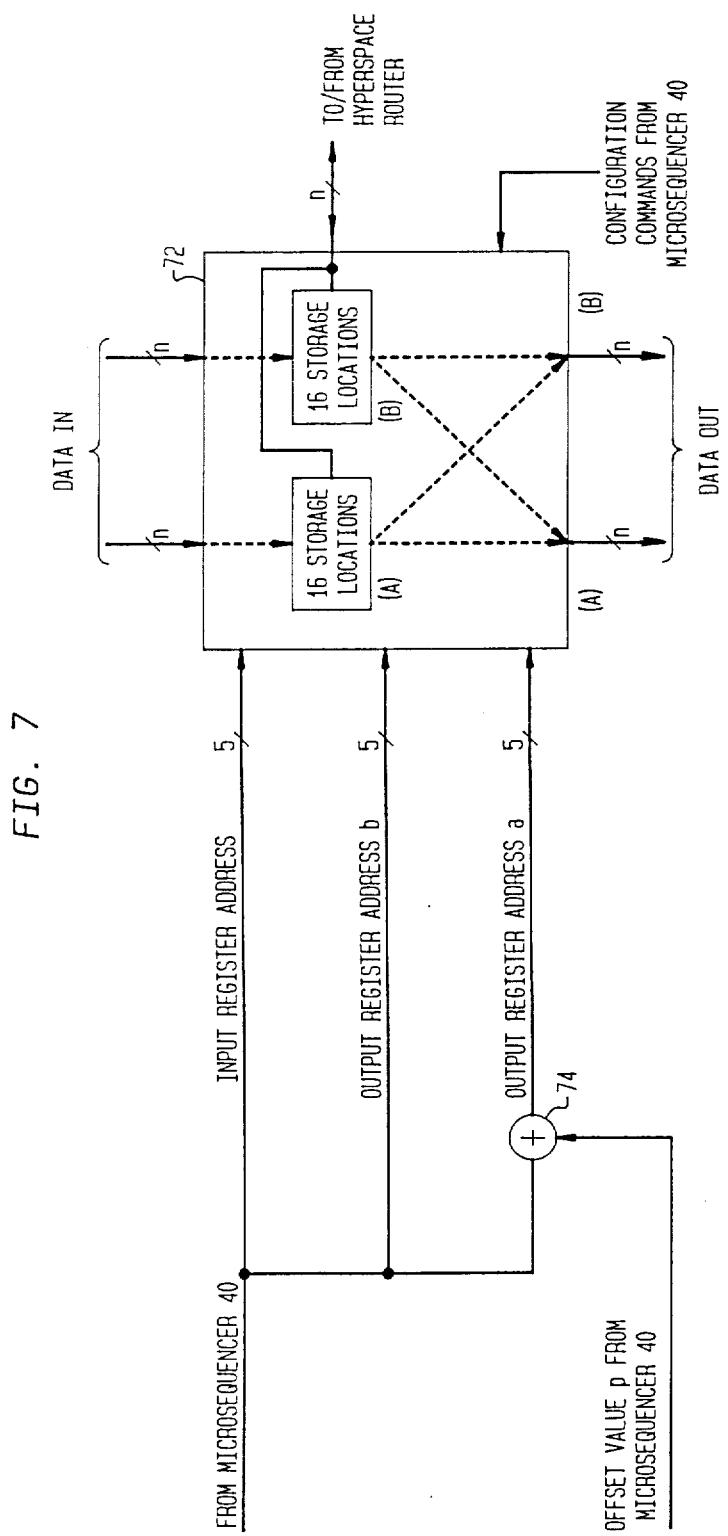
FIG. 7 is a schematic diagram of a $2 \times 2$ MASNET which illustrates how the input data stream can source two output data streams with a relative shift of "p" elements.

The details of a MASNET 26 (Memory Alu Switch NETwork) are shown in detail with sixteen inputs and sixteen outputs in FIG. 6. MASNET 26 is made up of register files 72 (e.g. Weitek 1066) that are cross connected in a Benes switching network arrangement and pipelined so as to make the connection of any input to any output non-blocking. The MASNET 26 illustrated in FIG. 6 is a sixteen-by-sixteen (16×16) circuit. The fact that each register file 72 has local memory also means that by using the MASNET 26 it is possible to reorder data as it flows through the network. This feature can be used, for example, to create two data streams from a common source in which one is delayed with respect to the other by several elements. The formation of multiple data streams from a common source is also a feature of MASNET 26. FIG. 7 illustrates more explicitly how a 2×2 MASNET (i.e. a single register file 72) can achieve both of these simple tasks.

MASNET 26 is used also for internode communications in that it routes data words corresponding to the nodal boundaries to bordering nodes 12 through hyperspace routers 80. This routing is achieved as the data flows through the MASNET 26 without the introduction of any additional delays. Likewise, the hyperspace router 80 of a given node 12 can inject needed boundary point values into the data stream as they are needed without the introduction of any delays. A more detailed discussion of internode communications follows.

Figure 8:
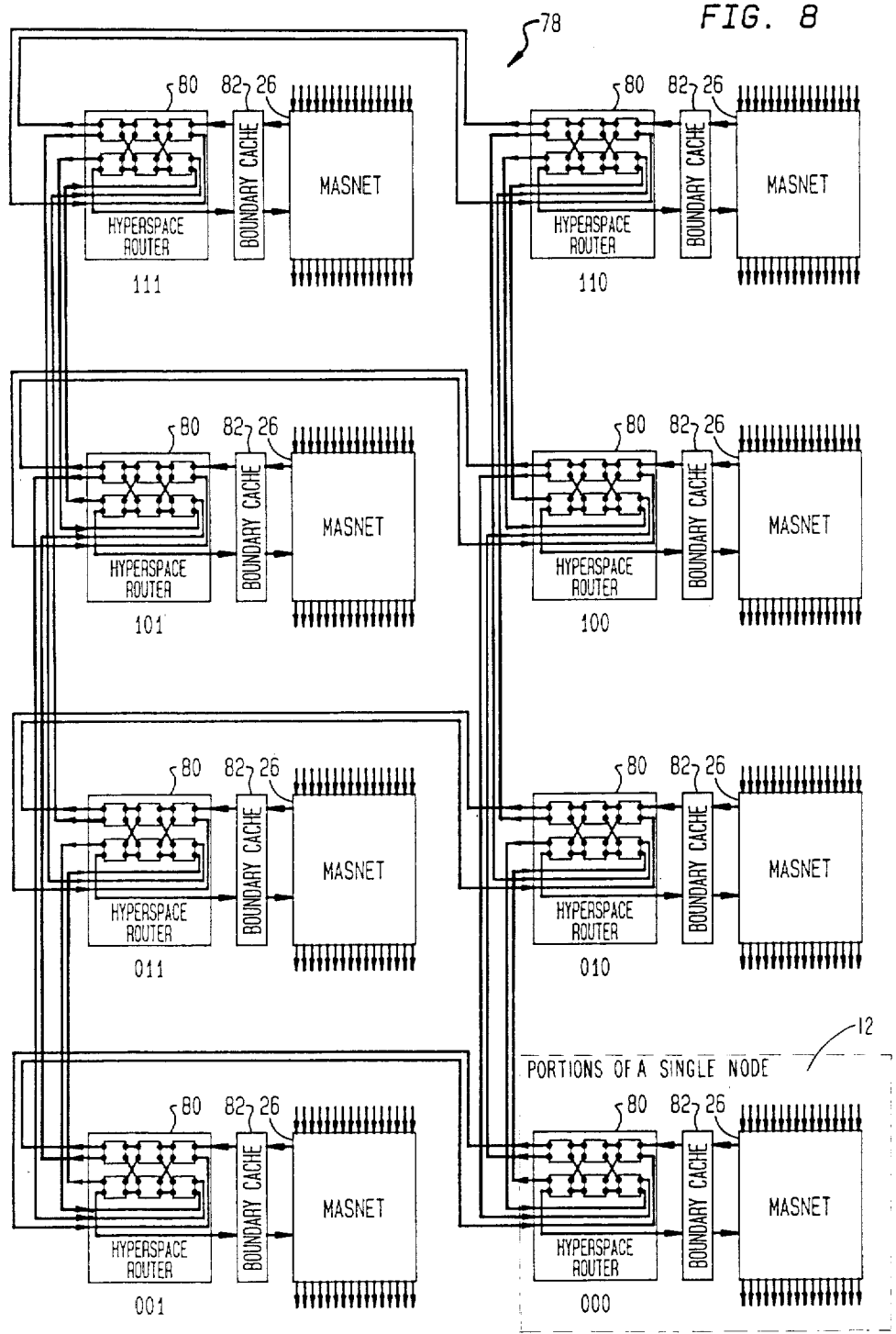
FIG. 8 is a schematic diagram of an 8-node hypercube showing the relationship of the hyperspace routers to the MASNET units of each node.

The global topology of the multinode computer 10 is that of a hypercube. The hypercube represents a compromise between the time required for arbitrary internode communications, and the number of physical interconnections between nodes 12. Two addressing modes support internode data communications, namely: (1) global addressed and (2) explicit boundary-point definition, or BPD. Global addressing is simply extended addressing, where an address specifies the node/memory-plane/offset of the data. From a software standpoint, the address is treated as a simple linear address whose range extends across all nodes in the computer 10. Internode communications is handled by software and is entirely transparent to the programmer if default arbitration and communications-lock parameters are chosen. BPD involves the explicit definition of boundary points, their source, and all destination addresses. Whenever BPD data is generated, it is immediately routed to BDP caches 82 in the destination nodes 12 as illustrated in FIG. 8. Local addressing and BPD may be intermixed. The main advantage of global addressing over BPD is software simplicity, although BPD has the capability of eliminating most internode communications overhead by precommunicating boundary-point data before they are requested by other nodes.

Data are physically routed between nodes 12 using local switching networks attached to each node 12. The local switching networks previously referred to as hyperspace routers 80 are illustrated in FIG. 8. Hyperspace routers 80 are non-blocking permutation networks with a topology similar to the Benes network. For a multinode class computer or order d (i.e., $NN=2^d$, NN=number of nodes), the hyperspace router permits d+1 inputs which includes d neighboring nodes 12 plus one additional input for the host node 12. The data are self-routing in that the destination address, carried with the data, is used to establish hyperspace router switch states. An eight node system is illustrated in FIG. 8. In this example, d=3, and each hyperspace router 80 has a 4×4 network with a delay of three minor clocks. For 3<d<8 where small d is an integer, an 8×8 router 80 is required, with d=7 providing complete switch utilization. Since the hyperspace router 8 must be configured for $ln_2 d=1$ inputs, optimal hardware performance is given by a computer array having the size of $$NN = \frac{2^{2n}}{2}, n = 0, 1, 2, 3 \ldots$$

Configurations of 1, 2, 8, 128, ... nodes fully utilize the hyperspace routers 80. Multinode computer configurations with non-integer $ln_2 d$ are also supported, except the hyperspace router 80 is scaled up to the next integral dimension. The implications of this are not severe, in that aside from the penalty of additional switch hardware, a slightly greater amount of storage is required for the permutation tables. The node stores these tables in a high-speed look up table. The length of the table is (d+1)?. When the computer grows beyond 128 nodes, the hyperspace router increases to a 16×16 switch. Since the look-up tables become prohibitively large, the permutation routing is then accomplished by bit-slice hardware which is somewhat slower than the look-up tables. These considerations have established 128 nodes as the initial, preferred computer configuration.

Data transmission between nodes 12 occurs over fiber-optic cables in byte-serial format at a duplex rate of 1 Gbyte/second. This rate provides approximately two orders-of-magnitude head room for occasional burst transmissions and also for future computer expansion. Each node 12 has a 1 Mword boundary-point write-through cache which, in the absence of host-node requests for cache bus cycles is continuously up-dated by the hyperspace router 80. Thus, current boundary data are maintained physically and logically olose to the ALU pipeline inputs.

While the invention has been described with reference to the preferred embodiment thereof it will be appreciated that various modifications can be made to the parts and methods that comprise the invention without departing from the spirit and scope thereof.

We claim:

1. A multi-node, parallel processing computer apparatus comprising:
    a plurality of nodes each including an internal memory and a reconfigurable arithmetic logic (ALU) pipeline unit and a memory/ALU/switch network (MASNET) for transferring data from said internal memory through said MASNET to said reconfigurable ALU pipeline unit and from said reconfigurable ALU pipeline unit through said MASNET to said internal memory, said reconfigurable ALU pipeline unit further including a first group of programmable processors permenantly connected together in a first configuration having four (4) inputs and one (1) output and a second group of programmable processors permanently connected together in a second configuration different from said first configuration, said second group having three (3) inputs and one (1) output, and an ALU pipeline configuration switching network means (FLONET) for selectively connecting said first and second groups to each other, and sequencer means for providing instructions to said FLONET once a clock cycle; and,
    router means for routing data between said nodes,
    wherein said reconfigurable ALU pipeline unit selectively performs different computations according to instructions from said sequencer means once a clock cycle.

2. A reconfigurable computer apparatus comprising:
    a first group of programmable processors permanently connected together in a first configuration having four (4) inputs and one (1) output, said first group including a first programmable processor having at least two (2) inputs and at least one (1) output; a second programmable processor having at least two (2) inputs and at least one (1) output; and, a third programmable processor having two (2) inputs permanently connected to the outputs of said first and second programmable processors, said third programmable processor also having an output, such that the four inputs of said first group comprise the inputs of said first and second programmable processors and the output of said first group comprises the output of said third programmable processor;
    a second group of programmable processors permanently connected together in a second configuration different from said first configuration, said second group having three (3) inputs and one 91) output and including a fourth programmable processor having two (2) inputs and one (1) output; and, a fifth programmable processor having two (2) input and one (1) output, one of said inputs of said fifth programmable processor being permanently connected to the output of said fourth programmable processor, such that the three (3) inputs of said second group comprise the two (2) inputs to said fourth programmable processor and the input to said fifth programmable processor not connected to the output of said fourth programmable processor, and the output of said second group comprising the output of said fifth programmable processor;
    a third group or programmable processors comprising individual processors having two (2) inputs and one (1) output;
    switching means (FLONET) for selectively connecting said first, second and third groups together; and,
    sequencer means for providing instructions to said FLONET once a clock cycle,
    wherein said apparatus selectively performs different computations according to instructions from said sequencer means once a clock cycle.

3. A reconfigurable computer apparatus including arithmetic/logic units (ALU), said apparatus comprising:
    at least a first substructure including three (3) ALU units permanently connected together in a first configuration having four (4) inputs and one (1) output;
    at least a second substructure including two (2) ALU units permanently connected together in a second configuration having three (3) inputs and one (1) output;
    at least a third substructure including at least one individual ALU unit having two (2) outputs and one (1) output;
    switching means for selectively connecting said first, second and third substructure together; and,
    sequencer means for providing instructions to said switching means,
    wherein said apparatus selectively performs computations according to instructions from said sequencer means.

4. A node apparatus for use in a multi-node, parallel processing system, said node apparatus comprising:
    an internal memory including a plurality of memory planes;
    a dynamically reconfigurable arithmetic logic (ALU) pipeline means for performing computations, including a plurality of ALUs at least three of which are permanently connected to each other;
    an ALU pipeline configuration switching network means (FLONET) for selectively connecting groups of said ALUs in said dynamically reconfigurable arithmetic logic pipeline means together;

a memory/ALU/switch network (dASNET) for transferring data from the memory planes of said internal memory through said MASNET to said dynamically reconfigurable ALU pipeline means and from said dynamically reconfigurable ALU pipeline means through said MASNET to said internal memory; and, sequencer means for providing instructions to said FLONET, wherein said dynamically reconfigurable ALU pipeline means selectively performs different computations according to instructions from said sequencer means.

5. The apparatus of claim 29 wherein said first group of programmable processors comprises:

a first programmable processor having at least two (2) inputs and at least one (1) output;

a second programmable processor having at least two (2) inputs and at least one (1) output; and, a third programmable processor having two (2) inputs permanently connected to the outputs of said first and said second programmable processors, said third programmable processor also having an output, wherein the inputs to said first group comprise the inputs of said first and second programmable processors and the output of said first group comprises the output of said third programmable processor.

6. The apparatus of claim 5 wherein said second group of programmable processors comprise:

a fourth programmable processor having at least two (2) inputs and at least one (1) output; and, a fifth programmable processor having two (2) inputs and one (1) output, one of said inputs of said fifth programmable processor being permanently connected to the output of said fourth programmable processor, wherein the inputs of said second group comprise the two inputs to said fourth programmable processor and the one input to said fifth programmable processor not connected to the output of said fourth programmable processor, and the output of said second group comprises the output of said fifth programmable processor.

7. The apparatus of claim 6 wherein said reconfigurable ALU pipeline unit further comprises:

a third group of programmable processors comprising individual programmable processors connected to said FLONET for selective connection with said first and second groups of programmable processors.

8. The apparatus of claim 7 wherein the ratio of said first group of programmable processors with respect to said second group of programmable processors in a given reconfigurable ALU pipeline unit is approximately in the range of 1.5–2.0 to 1.0.

9. The apparatus of claim 8 wherein the ratio of said second group of programmable processors to said third group of programmable processors is approximately 2.0 to 1.0.

10. The apparatus of claim 9 wherein said internal memory comprises a plurality of memory planes.

11. The apparatus of claim 10 wherein each memory plane comprises:

a main memory bank;

an address multiplexer for transmitting data to and from said main memory bank;

a prefetch address register connected between said main memory bank and said address multiplexer; and, a translate table means connected to said address multiplexer for scanning said assembly bank in a random access manner.

12. The apparatus of claim 11 wherein said sequencer means further comprises:

microsequencer means connected to said internal memory, MASNET and reconfigurable ALU pipeline unit for governing the clocking of data between said internal memory, MASNET and said reconfigurable ALU pipeline unit.

13. The apparatus of claim 12 wherein each node further comprises:

a microcontroller connected to said internal memory, MASNET and said reconfigurable ALU pipeline unit for initializing and verifying the status of said internal memory, MASNET and reconfigurable ALU pipeline.

14. The apparatus of claim 13 wherein said MASNET comprises:

a plurality of register files cross connected in a Benes switching network arrangement and pipelined so as to make the connection of any input to any output non-blocking.

15. The apparatus of claim 14 further comprising:

boundary-point definition (BPD) cache means connected between said router means and said MASNET for routing BPD data to specific destination nodes, wherein said apparatus supports both global addressing and explicit BPD addressing modes.

16. The apparatus of claim 15 further comprising:

a front end computer for feeding data and instructions to said nodes; and, off-line mass storage means connectable to said front end computer.

17. The apparatus of claim 16 wherein said nodes are connected together in the topology of a boolean hypercube and vary in number in the range of from 1 to 128.

18. The apparatus of claim 2 further comprising:

an internal memory; and, a memory-ALU switch network means (MASNET) for transferring data from said internal memory through said MASNET to said switching means and for transferring data from said switching means through said MASNET to said internal memory.

19. The apparatus of claim 18 wherein said sequences means further comprises:

microsequencer means connected to said internal memory, MASNET and switching means for governing the clocking of data between said internal memory, MASNET and switching means.

20. The apparatus of claim 19 further comprising:

microcontroller means connected to said internal memory, MASNET and switching means for initializing and verifying the status of said internal memory, MASNET and switching means.

21. The apparatus of claim 2 wherein at least some of said processors comprise floating point arithmetic processors.

22. The apparatus of claim 2 wherein at least some of said processors comprise integer arithmetic logic processors.

23. The apparatus of claim 2 wherein the ratio of said first group of programmable processors with respect to said second group of programmable processors is approximately in the range of 1.5–2.0 to 1.0.

24. The apparatus of claim 2 wherein the ratio of said second group of programmable processors to said third group of programmable processors is approximately 2.0 to 1.0.

* * * * *